Jan. 23, 1945. L. G. NAUMANN 2,367,734
FLUID MOTOR FOR DUAL BRAKES
Filed Dec. 27, 1943 2 Sheets-Sheet 1
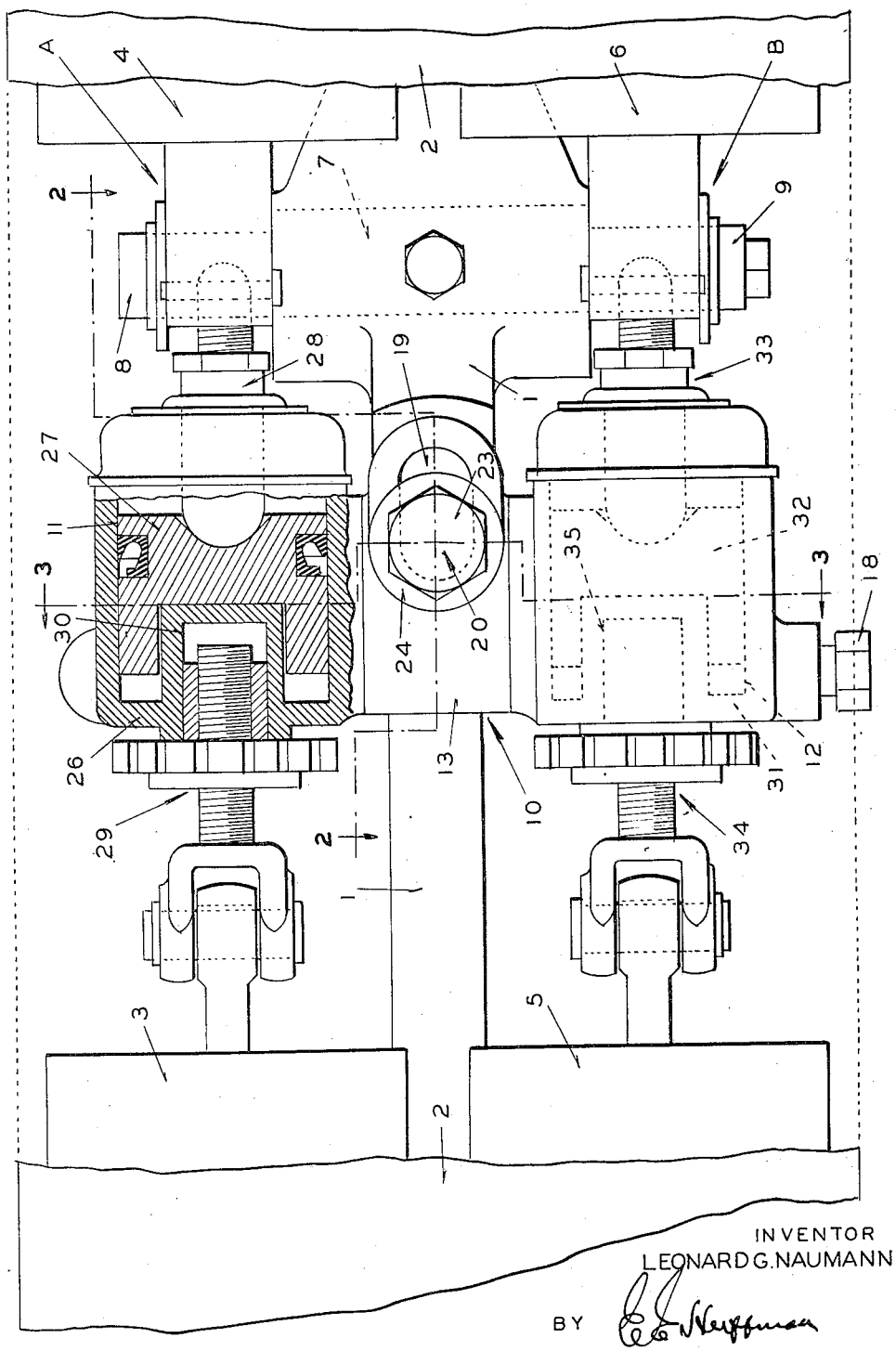
INVENTOR
LEONARD G. NAUMANN
BY
ATTORNEY Jan. 23, 1945.  L. G. NAUMANN  2,367,734
FLUID MOTOR FOR DUAL BRAKES
Filed Dec. 27, 1943   2 Sheets-Sheet 2
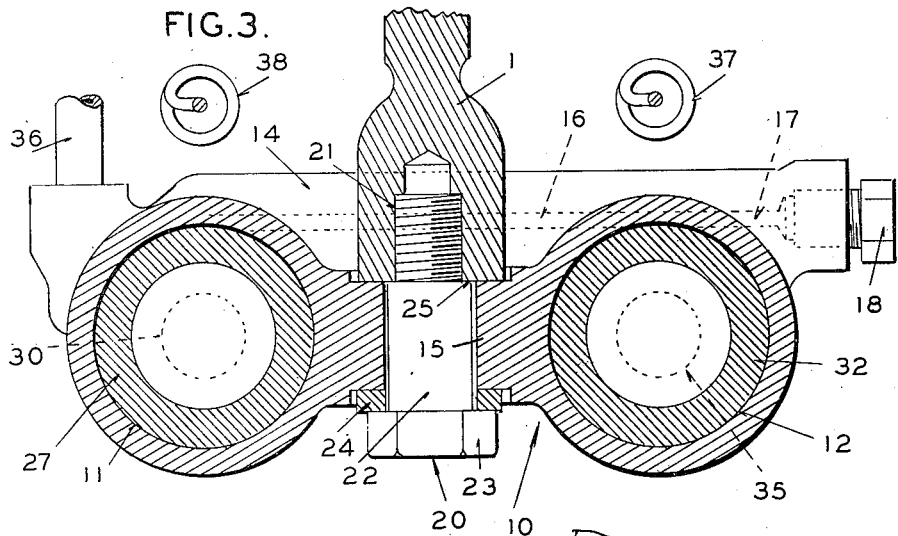
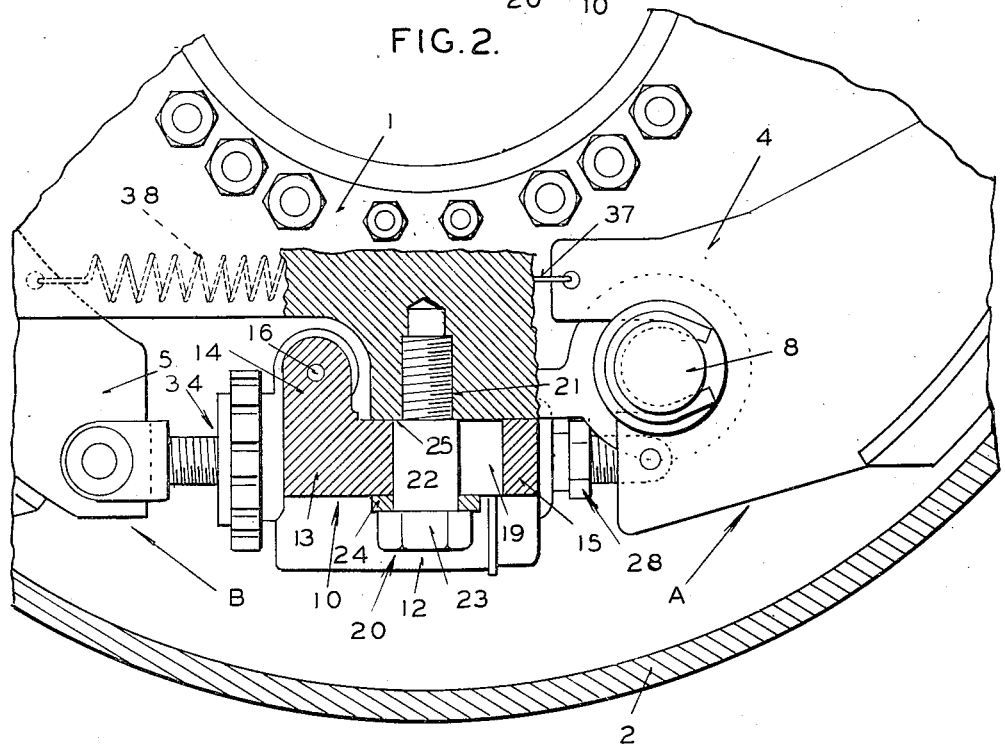
INVENTOR
LEONARD G. NAUMANN
BY
ATTORNEY Patented Jan. 23, 1945

2,367,734

UNITED STATES PATENT OFFICE 2,367,734

FLUID MOTOR FOR DUAL BRAKES

Leonard G. Naumann, Maplewood, Mo., assignor to Wagner Electric Corporation, St. Louis, Mo., a corporation of Delaware Application December 27, 1943, Serial No. 515,708

6 Claims. (Cl. 188—152)

My invention relates to brakes and more particularly to actuating means for dual brakes.

One of the objects of my invention is to provide an improved double fluid motor construction and mounting arrangement for use in actuating adjacent brake shoe ends of dual brakes.

Another object of my invention is to so mount a unitary double fluid motor construction on a support that said motors are permitted to float during actuation of the brake shoes of a dual brake and at the same time be sufficiently free to become so positioned by a pivotal movement that each motor will apply the same force to the shoes it actuates in the event there are differences in lining wear of like shoes of the dual brake.

Other objects of my invention will become apparent from the following description taken in connection with the accompanying drawings in which Figure 1 is a bottom view showing a portion of a dual brake having actuating double fluid motors constructed and mounted in accordance with my invention; and Figures 2 and 3 are sectional views taken on the lines 2—2 and 3—3, respectively, of Figure 1.

Referring to the drawings in detail, my improved fluid motor construction and mounting arrangement is shown as employed for operating the lower ends of two sets of brake shoes of a dual brake but it is to be understood that it can be employed wherever it is desired to actuate adjacent shoe ends of dual brakes. The dual brake has a supporting member 1 secured to some fixed part and a drum 2 fixed to a rotatable part which is to be braked. The brakes "A" and "B," forming the dual brake, are positioned on opposite sides of the supporting member, the brake "A" comprising brake shoes 3 and 4 mounted on one side of the support and the brake "B" comprising brake shoes 5 and 6 mounted on the other side. The lower ends of brake shoes 4 and 6 have associated therewith an anchor pin 7 carried by the support. The pin has eccentric end portions 8 and 9 extending from opposite sides of the support for adjusting purposes, the end portion 8 cooperating with the notched end of shoe 4 and the eccentric portion 9 cooperating with the notched end of brake shoe 6. In the particular dual brake construction shown the ends of the brake shoes 4 and 6 remote from anchor pin 7 are also to be anchored and actuated by any suitable means but since such construction has nothing to do with applicant's invention, it is believed unnecessary to show or describe it. The ends of brake shoes 3 and 5 remote from the ends shown also have anchor means associated therewith which are not shown.

Positioned between the ends of shoes 3 and 4 and the ends of shoes 5 and 6 forming the dual brake is a double fluid motor comprising a single member 10 having embodied therein spaced apart parallel cylinders 11 and 12 which are connected by a part 13. The cylinders are so spaced apart that the cylinder 11 will be positioned between the ends of brake shoes 3 and 4 and cylinder 12 between the ends of brake shoes 5 and 6. The intermediate connecting part 13 has an enlarged portion 14 and a flat portion 15. The enlarged portion is between a pair of ends of the cylinders and has drilled therethrough a passage 16 for placing the two cylinders in communication with each other, said drilled passage extending to the exterior of cylinder 12 (shown in Figure 3) to provide an outlet 17 for the two cylinders. This outlet is controlled by a bleeder valve 18 in the form of a threaded plug.

The flat portion of the intermediate connecting part 13 is formed with a slot 19 lying midway between the axes of the cylinders and extending longitudinally of said cylinders. Received in this slot is a bolt 20 positioned at right angles to the plane in which the axes of the parallel cylinders lie, said bolt being threaded into a bore 21 of the support 1 to fasten the member 10 on the support. The body portion 22 of the bolt is of slightly smaller diameter than the width of the slot and the head 23 of the bolt holds the member 10 in position. A washer 24 is provided between the head of the bolt and the flat portion of the connecting part to provide additional bearing surface. The threaded portion of the bolt is of slightly smaller diameter than the body portion 22 in order to provide shoulder means 25 for determining the extent to which the bolt can be screwed up and thus insure that the bolt cannot be so tightened as to interfere with the free pivotal and sliding movement of member 10.

The cylinder 11 is closed at one end by a wall 26 and open at its other end and within this cylinder is a piston 27. This piston is connected to the lower end of shoe 4 by an adjustable linkage 28, said linkage having a ball and socket arrangment with the piston. The closed end of the cylinder is connected with the lower end of brake shoe 3 by an adjustable connection 29 which is associated with a socket 30 in the end wall of said cylinder.

The cylinder 12 is likewise closed at one end by a wall 31 and its other end is open. Within this cylinder is a piston 32 which is connected to the lower end of brake shoe 6 by adjustable linkage 33 which has a ball and socket arrangement with the piston. The closed end of the cylinder is connected to the lower end of brake shoe 5 by an adjustable connecting means 34 which is associated with a socket 35 in the end wall of the cylinder.

Cylinder 11 is connected to a supply conduit 36 whereby fluid under pressure may enter this cylinder and also cylinder 12 through the connecting passage 16. The supply conduit may come directly from a source of fluid pressure or from actuating fluid motors mounted at the top of the brake if such is employed for actuating the other ends of brake shoes 4 and 6. Associated with the lower ends of the brake shoes 3 and 4 is a retracting spring 37 and a like retracting spring 38 is associated with brake shoes 5 and 6. These retracting springs hold the brake shoes 3 and 5 released from the drum and brake shoes 4 and 6 released from the drum and engaged with anchor pin 7.

When fluid under pressure is admitted to the cylinders through the supply conduit 36 the pistons and cylinders will be moved relatively to each other and spreading forces will be applied to the ends of brake shoes 3 and 4 and to the end of brake shoes 5 and 6. The member within which cylinders 11 and 12 are embodied is free to slide relatively to the support by the pin and slot arrangement. Thus it is seen that the fluid motors formed by the cylinders and pistons are free to act as floating fluid motors so that equal fluid pressures will be applied to the lower ends of each set of brake shoes. If the drum should be rotating in the clockwise direction, the ends of shoes 3 and 5 will be engaged with the drum and the ends of brake shoes 4 and 6 will be moved away from the anchor pin and engaged with the drum under the action of the spreading forces. If the drum should be rotating in the counterclockwise direction and if shoes 4 and 6 should have an actuating force applied to their ends remote from those shown, the spreading forces acting between the lower ends of the shoes by the double fluid motors shown will be effective to actuate only shoes 3 and 5 into engagement with the drum since the forces effective on shoes 4 and 5 will not be sufficient to overcome the force being applied to the remote ends of the shoes plus the force which is caused by the drag of the brake drum on the shoes. The pin and slot mounting of the cylinders 11 and 12 permit them to slide freely to move shoes 3 and 5.

Since the brake shoes are provided with lining which is subject to wear, it is possible that the linings on the various shoes may wear unevenly. If uneven wear takes place, it will not have any effect in preventing unequal forces from being applied to the shoes when the mounting arrangement described is employed since member 10 in which cylinders 11 and 12 are embodied is free to pivot on the support. Such would not be possible if the member 10 could only slide longitudinally with respect to the cylinder axes. If the lining on shoe 3 should wear faster than the lining on shoe 5, the member 10 can pivot and thus permit a greater longitudinal movement of cylinder 11 so that the applied forces to the shoes will remain equal. Sufficient pivoting of member 10 is permitted for all possible differences in lining wear by the slight clearance between the body of bolt 20 and the slot in which it is received and also the clearances between the adjustable connecting means 29 and 34 and the shoes and cylinders with which they are associated. Furthermore, the shoes 3 and 5 are mounted in order to have some axial shifting in the drum thus adding to the permissible pivoting of member 10. Pivotal movement of member 10 will not be resisted by the connecting linkages between pistons 27 and 32 and shoes 4 and 6 due to the ball and socket arrangement with the pistons.

From the foregoing it is seen that a double floating fluid motor mounting arrangement is provided for dual brakes which permits the cylinders to be embodied in a single member in order to be connected by a drilled passage. The cylinders are free to have sufficient movement in other than a longitudinal direction so that unequal applying forces will not be present when there is a difference in wear of shoe linings.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, a support, two brake shoes positioned on each side of the support and having adjacent ends, two spaced parallel cylinders having a rigid intermediate connecting means, means for mounting the cylinders on the support so that said cylinders are on opposite sides of the plane of the support with each cylinder positioned between the adjacent ends of two shoes on the same side of the support, said mounting means comprising means associated with the connecting means and the support for permitting pivoting of the cylinders about an axis at right angles to the plane in which the axes of the cylinders lie and said last mentioned means also permitting bodily longitudinal movement of the cylinders, a piston in each cylinder, a connection between each piston and a brake shoe, and a connection between each cylinder and a brake shoe.

2. In braking apparatus, a support, two brake shoes positioned on each side of the support and having adjacent ends, a single member provided with parallel cylinders, means for mounting the member on the support so that the cylinders are on opposite sides of the plane of the support with each cylinder positioned between the adjacent ends of two shoes on the same side of the support, said mounting means comprising means permitting pivoting of the member about an axis in a plane at right angles to the axis of the brake and said mounting means also allowing bodily movement of the member in a plane at right angles to the pivotal axis, a piston in each cylinder, a connection between each piston and a brake shoe, and a connection between each cylinder and a brake shoe.

3. In braking apparatus, a support, two brake shoes positioned on each side of the support and having adjacent ends, a single member provided with parallel cylinders, means for mounting the member on the support so that the cylinders are on opposite sides of the plane of the support with each cylinder positioned between the adjacent ends of two shoes on the same side of the support, said mounting means comprising a slot in the member extending longitudinally between the cylinders and a pin carried by the support and extending through the slot, a piston in each cylinder, a connection between each piston and a brake shoe, and a connection between each cylinder and a brake shoe.

4. In braking apparatus, a support, two brake shoes positioned on each side of the support and having adjacent ends, a single member provided with parallel cylinders and a passage for placing the cylinders in communication with each other, means for mounting the member on the support so that the cylinders are on opposite sides of the plane of the support with each cylinder positioned between the adjacent ends of two shoes on the same side of the support, said mounting means comprising means permitting pivoting of the member about an axis in a plane at right angles to the axis of the brake and said last mentioned means allowing bodily movement of the member in a plane at right angles to the pivotal axis, a piston in each cylinder, a connection between each piston and a brake shoe, a connection between each cylinder and a brake shoe, a supply conduit connected to one cylinder, and a valve-controlled outlet for the other cylinder.

5. In braking apparatus, a support, two brake shoes positioned on each side of the support and having adjacent ends, two spaced parallel cylinders having a rigid intermediate connecting means provided with a drilled passage placing the cylinders in communication with each other, means for mounting the cylinders on the support so that said cylinders are on opposite sides of the plane of the support with each cylinder positioned between the adjacent ends of two shoes on the same side of the support, said mounting means comprising a slot in the intermediate connecting means extending longitudinally of the cylinders and spaced equally from the axes thereof and a pin extending through the slot for holding the cylinder on the support and for permitting either the pivoting of the cylinders in the plane of their axes or a longitudinal shifting thereof, a piston in each cylinder, a connection between each piston and a brake shoe, a connection between each cylinder and a brake shoe, and a supply conduit connected to one of the cylinders.

6. In braking apparatus, a support, two brake shoes positioned on each side of the support and having adjacent ends, a single member provided with parallel cylinders, an intermediate connecting part having a flat portion and a passage in said part placing both cylinders in communication with each other, means for mounting the member on the support so that the cylinders are on opposite sides of the plane of the support with each cylinder positioned between the adjacent ends of two shoes on the same side of the support, said mounting means comprising a slot in the flat portion of the member extending longitudinally between the cylinders, a pin carried by the support and extending through the slot and means on the pin cooperating with the flat portion for holding the member on the pin but permitting the member to have pivotal or sliding movement with respect to the pin and support, a piston in each cylinder, a connection between each piston and a brake shoe, a connection between each cylinder and a brake shoe, and a supply conduit connected to one of the cylinders.

LEONARD G. NAUMANN.